United States Patent
Parent et al.

(10) Patent No.: US 7,448,147 B2
(45) Date of Patent: Nov. 11, 2008

(54) NOZZLE INSERT FOR A YANKEE IMPINGEMENT HOOD

(75) Inventors: Laurent Roland Parent, Westbrook, ME (US); David Simpson Morrison, Kennebunk, ME (US); Craig Ernest Yerxa, Greenland, NH (US); Rita Elizabeth Cantor, Gorham, ME (US); Darrell Herbert Ketch, Standish, ME (US)

(73) Assignee: Metso Paper USA, Inc., Biddeford, ME (US)

(*) Notice: Subject to any disclaimer, the term of this patent is extended or adjusted under 35 U.S.C. 154(b) by 108 days.

(21) Appl. No.: 10/995,079

(22) Filed: Nov. 22, 2004

(65) Prior Publication Data
US 2006/0107549 A1    May 25, 2006

(51) Int. Cl.
*F26B 13/00*    (2006.01)
(52) U.S. Cl. ............................. 34/641; 34/638; 34/585
(58) Field of Classification Search ............... 34/114, 34/115, 117, 120, 666, 638, 122, 451, 452, 34/84, 443, 444, 540, 541, 585, 641; 415/115, 415/191; 181/222, 286, 290, 293, 149, 155; 239/641, 461, 498, 499, 553.5; 454/310
See application file for complete search history.

(56) References Cited

U.S. PATENT DOCUMENTS

| | | | |
|---|---|---|---|
| 3,012,335 A | | 12/1961 | Allander et al. |
| 3,217,628 A | * | 11/1965 | Sweeney et al. ............ 454/310 |
| 3,675,337 A | | 7/1972 | Daane |
| 4,081,913 A | | 4/1978 | Salminen |
| 4,378,640 A | | 4/1983 | Buchholz |
| 4,492,044 A | | 1/1985 | Knutsen |
| 4,538,360 A | | 9/1985 | Chance et al. |
| 5,784,804 A | | 7/1998 | Nowakowski |
| 6,154,981 A | | 12/2000 | Heikkila |
| 6,442,864 B2 | | 9/2002 | Ringer et al. |
| 6,449,874 B2 | | 9/2002 | Pellinen |
| 6,470,598 B2 | | 10/2002 | Ringer |
| 6,581,302 B1 | | 6/2003 | Philipp et al. |
| 6,712,698 B2 | | 3/2004 | Paulsen et al. |
| 6,916,247 B2 | | 7/2005 | Gatto et al. |

\* cited by examiner

*Primary Examiner*—Kenneth B Rinehart
(74) *Attorney, Agent, or Firm*—Pierce Atwood LLP; Kevin M. Farrell; Katherine A. Wrobel

(57) ABSTRACT

The present invention includes a nozzle insert for use in a drying machine of the type used in paper web drying. The nozzle insert of the present invention includes at least one intake having a central portion, wherein a pair of center vanes is disposed for directing airflow. The central portion is bounded by at least one turning vane adapted for directing airflow in a lateral direction. For each turning vane, there is at least one straightening vane adapted for curtailing swirling of the airflow. The vanes are oriented at optimal angles for directing the flow of the nozzle in a lateral direction, while permitting some air to penetrate the central portion through a series of ports. The intakes are bounded by a series of insulated bulkheads, which serve to direct airflow and contain heat-loss through thermal emission.

13 Claims, 4 Drawing Sheets

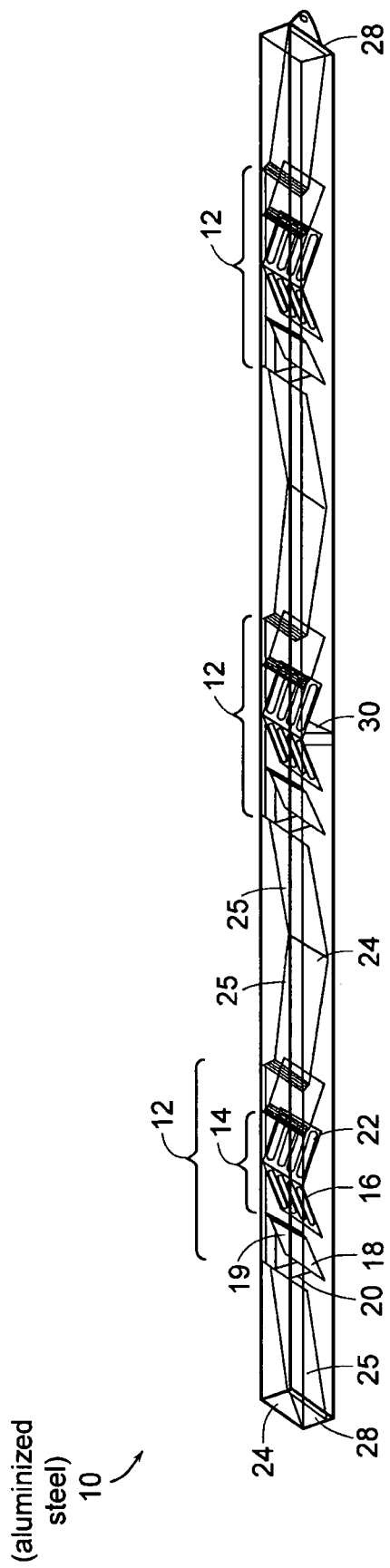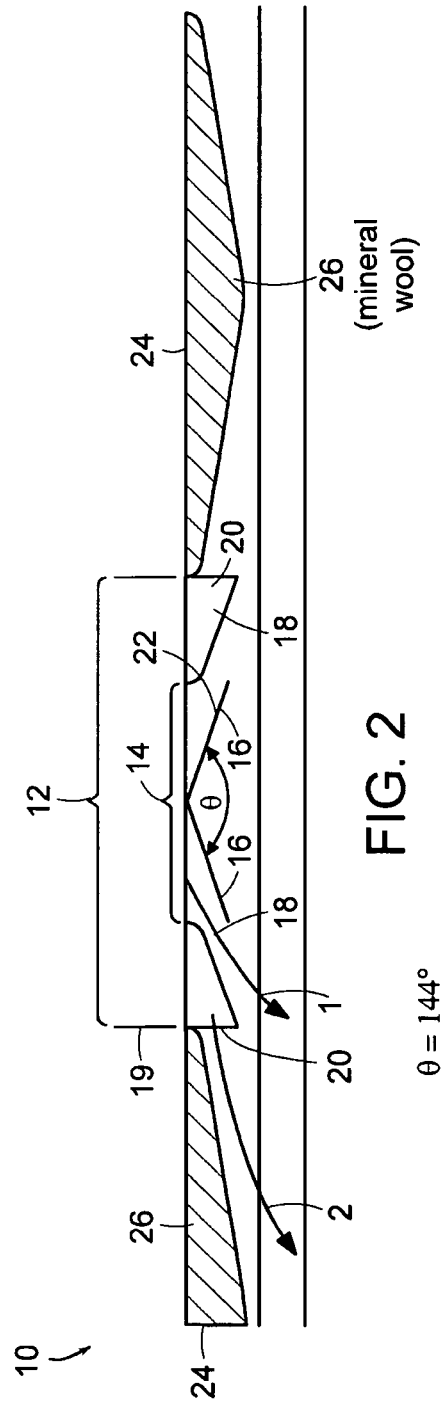

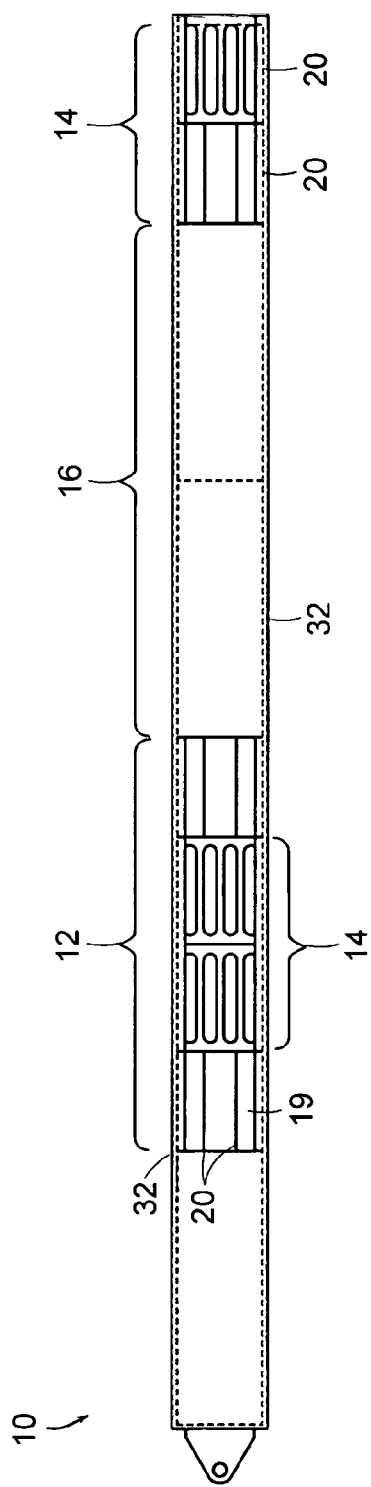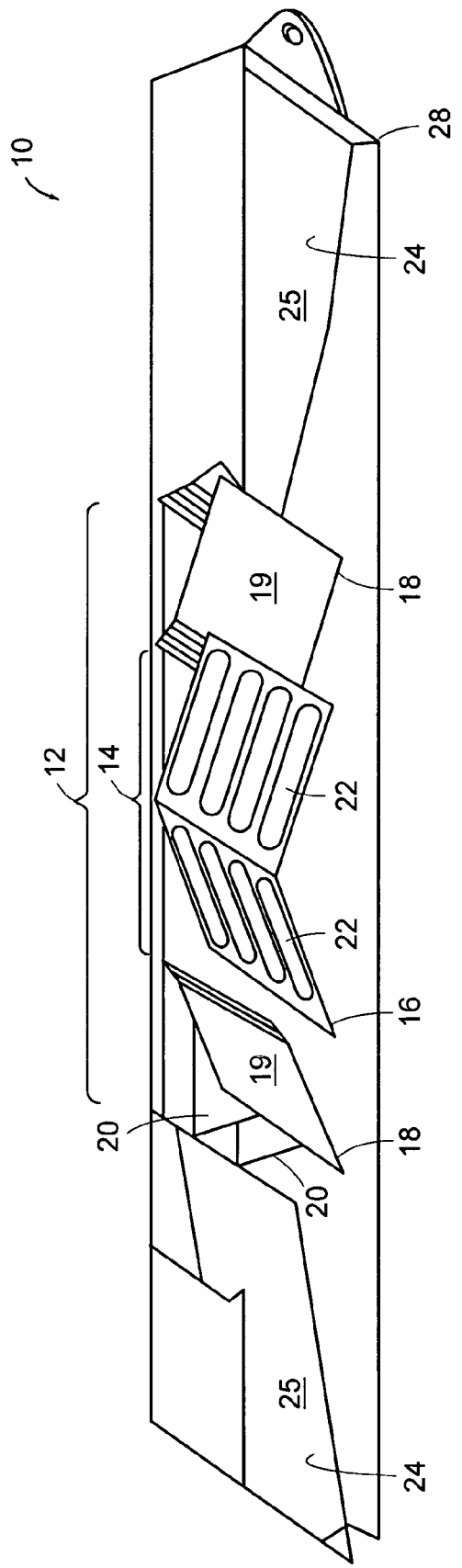

NOZZLE INSERT FOR A YANKEE IMPINGEMENT HOOD

BACKGROUND OF THE INVENTION

1. Field of the Invention

The present invention relates to the field of paper web drying and in particular to the directing and heating of air in a Yankee Impingement Hood of the type known in the art.

2. Description of the Related Art

A Yankee hood is an air distribution and drying system typically used in the paper industry. A Yankee hood is typically installed over and spaced-apart from a portion of the circumferential surface of a rotatable cylinder. The drying air is heated and pressurized in the system and is then supplied to the Yankee hood dryer where it passes through nozzles at high velocity and impinges on the moving, drying web. The spent air is then collected in the dryer and returned to a recirculation system. Some of this spent air is exhausted, but the majority of it is recirculated to conserve heat.

The heat which is transferred from the impingement air from the nozzles to the paper increases the temperature of the paper to its equilibrium drying temperature; evaporates the water from the paper; and increases the temperature of the paper above the equilibrium temperature after the surface water has been evaporated.

Increasing production rates called for in the industry today result in demands for higher and higher evaporation rates. Achieving evaporation rates considerably higher than those currently available must be realized largely through improvements to the Yankee hood system. In a Yankee hood, the evaporation is driven largely by convection heat transfer, brought upon by the effect of impinging jets of hot air and radiation heat transfer. Effectiveness of hood evaporation largely depends on geometry of impingement air, properties of impingement air, and temperature.

A problem found in current drying systems involves the uneven cross-machine movement and temperature profiles of the impinging air. Temperature profile problems can, and often do, originate at the crescent header and nozzle box. This is more pronounced at higher operating temperature. In particular, it is common for the temperature profile of the air to vary dramatically—often very high temperatures are found directly below the crescent headers and lower temperatures at the troughs between crescent headers. An uneven temperature profile will lead inevitably to a lack of uniformity in the drying process, which can cause sheet breaks and increase production costs and maintenance of the paper-drying machines.

Accordingly, there is a need in the art for an improved Yankee-type drying system that provides a uniform temperature profile through the nozzle box. There is a further need in the art for an apparatus that can be adapted to fit into existing Yankee-type drying systems in order to provide temperature uniformity. Finally, there is a need in the art for a more reliable and cost-effective process for drying paper webs.

SUMMARY OF THE INVENTION

Accordingly, the present invention addresses the problem of thermal non-uniformity in the drying section of the hood by providing a nozzle box insert that results in a more uniform temperature and a more uniform nozzle velocity in the cross-machine direction. The nozzle insert of the present invention includes at least one intake having a central portion, wherein a pair of center vanes is disposed for directing airflow. The central portion is bounded by at least one turning vane adapted for directing airflow in a lateral direction. For each turning vane, there is at least one straightening vane adapted for curtailing swirling of the airflow. The vanes are oriented at optimal angles for directing the flow of the nozzle in a lateral direction, while permitting some air to penetrate the central portion through a series of ports.

In a typical nozzle insert, there are a plurality of intakes, each containing a full set of vanes and ports. The intakes are separated by bulkheads, which serve two purposes. First, the bulkheads are shaped to mirror the angles of the respective vanes, thus encouraging airflow in the lateral direction. Secondly, the bulkheads may be insulated to prevent excess heat loss through thermal emission. The preferred design and shape of the bulkheads is dependent upon the respective embodiment of the intakes and vanes, as described further below. The nozzle insert of the present invention is preferably constructed of a low emissivity material for further reducing the loss of heat through emission. The nozzle insert of the present invention can be readily incorporated into a web-drying machine of the type commonly used in the paper industry. In particular, the nozzle insert is readily adaptable for use in a Yankee hood having a series of crescent headers and nozzle boxes for drying a moving paper web.

The foregoing is intended as a summary of the novel and useful features of the present invention. Further aspects, features and advantages of the invention will become apparent from consideration of the following detailed description and the appended claims when taken in connection with the accompanying drawings.

BRIEF DESCRIPTION OF THE DRAWINGS

FIG. 1 is a perspective view of a nozzle insert in accordance with an embodiment of the present invention.

FIG. 2 is a cross-sectional view of a portion of a nozzle insert in accordance with an embodiment of the present invention.

FIG. 3 is a plan view of a portion of a nozzle insert in accordance with an embodiment of the present invention.

FIG. 4 is a perspective view of a portion of a nozzle insert in accordance with an embodiment of the present invention.

DETAILED DESCRIPTION OF THE INVENTION

Figure 6:
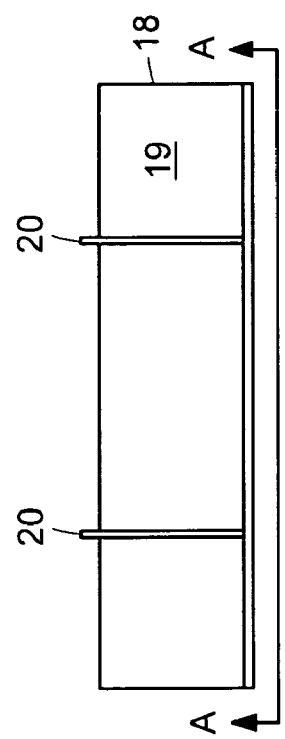
FIG. 6 is a sectional view of a turning vane usable in the nozzle insert of the present invention.

Referring now to FIGS. 1-4, a nozzle insert 10 is shown in accordance with the present invention shown in various views to more distinctly describe the subject matter of the following claims. The reference numerals refer to the same feature of the nozzle insert 10 throughout each of the Figures.

The nozzle insert 10 shown in FIG. 1 includes an air intake 12 having a central portion 14 therein. A pair of central vanes 16 is centrally located in the central portion 14. The effect of the central vanes 16 is to direct the air laterally in the general direction of arrow 1 shown in FIG. 2. In one embodiment, the central vanes 16 define a first angle $\theta$ that is between 90 and 170 degrees. In a preferred embodiment, the first angle $\theta$ is approximately 144 degrees. The central vanes 16 define a plurality of entry ports 22 that permit a limited amount of air to pass directly through the central portion 14 without being laterally diverted. The entry ports 22 are best seen in FIG. 3, which is a plan view of the present invention. In a preferred embodiment, there are three entry ports 22 per central vane 16, resulting in a total of six entry ports 22 for each pair of central vanes 16.

The air intake 12 also includes at least one turning vane 18 that is laterally disposed relative to the central portion 14. The turning vane 18 serves to direct air in a lateral or cross-box direction shown by arrow 2 in FIG. 2. The turning vane 18 is substantially planar in form, and thus defines a first surface 19 that deflects the oncoming airflow in the direction of arrow 2.

Figure 5:
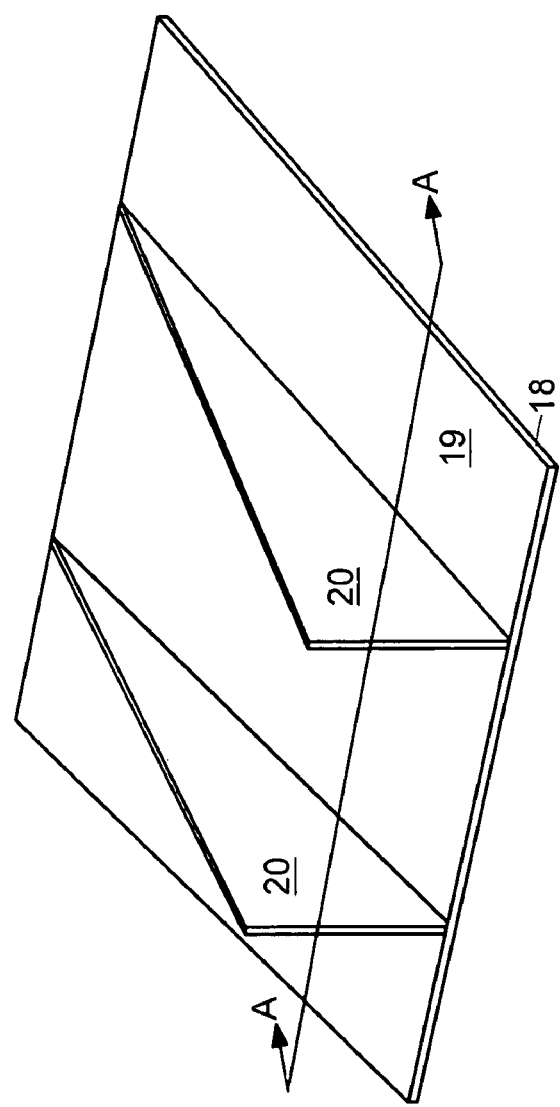
FIG. 5 is a perspective view of a turning vane useable in the nozzle insert of the present invention.

Turning to FIG. 5, the turning vane 18 is shown to the exclusion of the other portions of the nozzle insert 10. The turning vane 18 has a straightening vane 20 disposed thereon. The straightening vane 20 serves to reduce any swirling of the airflow as it passes along the turning vane 18.

FIG. 6 is a sectional view along line A that illustrates the relationship between the turning vane 18 and the straightening vane 20. As shown, the straightening vane 20 is oriented such that it is perpendicular to the first surface 19 of the turning vane 18. In a preferred embodiment, there is a pair of straightening vanes 20 on each turning vane 18, and thus four straightening vanes 20 for each air intake 12. It should be understood by those skilled in the art that the exact ratio of vanes for each air intake 12 is dependent upon the precise application, temperature, and air profile desired.

The nozzle insert 10 also includes at least one bulkhead 24 that is disposed within the nozzle insert 10 at its ends 28 and optionally between multiple air intakes 12, as shown in FIG. 1. The at least one bulkhead 24 defines a plurality of surfaces 25 that are oriented in such a fashion as to mirror the surfaces of the turning vane 18. That is, the surfaces 25 of the bulkhead 24 viewed in conjunction with the turning vanes 18 define a rectangular cross-section through which the airflow is guided. In a preferred embodiment, the bulkhead 24 is hollow, and most preferably, the bulkhead contains an insulating material 26, such as mineral wool. The insulated bulkhead 24 therefore serves to maintain the airflow profile as well as the air temperature by preventing any thermal leakage through the nozzle insert 10. In a preferred embodiment, the side surfaces 32 of the nozzle box 10 will also be insulated to further reduce heat loss through thermal conduction. A preferred insulator for the side surfaces 32 is fiberglass, although it is understood that any number insulating materials could be used in this regard.

In a preferred embodiment, the nozzle insert 10 is comprised of a material that has low thermal emissivity. One such preferred material is aluminized steel, which has an emissivity on the order of 0.43. Other suitable materials with a low emissivity may also be used in the fabrication of the nozzle insert 10.

In preferred embodiments, the nozzle insert 10 is sized appropriately to fill a nozzle box (see FIG. 7) as part of a Yankee hood. The nozzle insert 10 will typically include two or three different air intakes 12, and may include as many as ten different intakes, each defining a separate central portion 14 and having the requisite vanes and entry ports described above. A support member 30 may be provided to increase the rigidity of the nozzle insert 10 and increase its usable lifetime. The perspective view of FIG. 1 is emblematic of this preferred embodiment.

Figure 7:
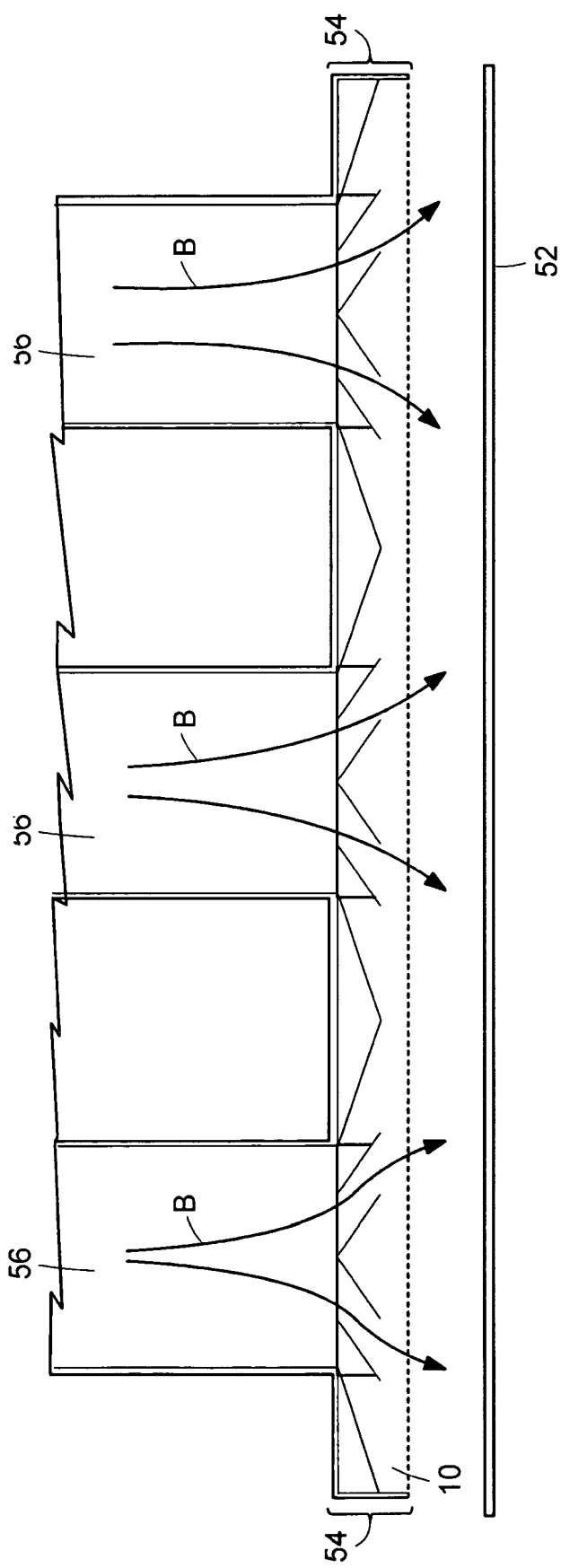
FIG. 7 is a cross sectional view of a web-drying machine incorporating the nozzle insert of the present invention.

In operation, the nozzle insert 10 of the present invention prevents air from idly moving in the cross direction across the top of a nozzle box (see FIG. 7). The nozzle insert 10 directs air in a lateral direction, shown by arrows 1 and 2, while the straightening vanes 20 disposed on the turning vanes 18 prevent the air from swirling. By reducing the time that the air is in transit, the nozzle box insert 10 maintains higher temperatures and a more even temperature gradient across the face of a paper web, thus resulting in a higher quality end product. In order to maintain the temperature uniformity desired, the nozzle insert 10 is fabricated of a material having a low emissivity in order to reduce heat loss through thermal emissions. The bulkheads 24 of the nozzle insert are filled with an insulating material in order to prevent further heat loss.

FIG. 7 is a cross-sectional view of a web-drying machine 50 having a nozzle insert 10 in accordance with the present invention. FIG. 7 represents a nozzle box 54 connected to a series of crescent headers 56 that direct air from a blower onto a moving web 52. The nozzle insert 10 is shown at the base of the nozzle box 54 directing air, represented by arrows designated B, onto the web 52 in the manner described above.

It should be understood that FIG. 7 illustrates what would be one of numerous nozzle boxes in a Yankee hood, commonly used in the air-drying industry. While only one crescent header conduit and nozzle box is illustrated, it will be appreciated that the nozzle insert 10 of the present invention can be utilized in each nozzle box or selected nozzle boxes in the associated Yankee hood.

The nozzle insert of the present invention attains the goal of temperature uniformity through directional control of the airflow and reductions in the thermal losses of the machine itself through improved materials and design. The present invention maintains a uniform air temperature by reducing heat loss through a various means. The nozzle insert 10 of the present invention reduces heat loss by directing the air such that its path length is as short as possible, thereby eliminating swirl and eddies. Moreover, insulation in key locations discussed above reduces thermal conduction. Finally, low emissivity surfaces reduce radiation heat loss.

It should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

We claim:

1. A nozzle insert for a web-drying machine of the type including a nozzle box for directing airflow at a web, the nozzle insert comprising:
   an intake having a central portion;
   at least one hollow bulkhead disposed lateral to the intake and filled with an insulating material;
   a pair of center vanes which define a plurality of entry ports, such that the pair of center vanes are disposed within the central portion for directing;
   a turning vane disposed lateral to the central portion, the turning vane adapted for directing airflow in a lateral direction; and
   a straightening vane disposed on the turning vane, the straightening vane adapted for curtailing swirling of the airflow.

2. The nozzle insert of claim 1 wherein the insulating material is mineral wool.

3. The nozzle insert of claim 1 wherein the nozzle insert is comprised of a low emissivity material.

4. The nozzle insert of claim 3 wherein the low emissivity material is aluminized steel.

5. The nozzle insert of claim 1 wherein the turning vane defines a first surface, and further wherein the straightening vane is perpendicular to the first surface.

6. The nozzle insert of claim 1 wherein the pair of center vanes define a first angle, and further wherein the first angle is between 90 and 170 degrees.

7. The nozzle insert of claim 6 wherein the first angle is 144 degrees.

8. A web-drying machine comprising:

a crescent header;

a nozzle box receiving air from the crescent header and directing airflow at a web; and a nozzle insert disposed within the nozzle box, the nozzle insert comprising an intake having a central portion, at least one hollow bulkhead disposed lateral to the intake and filled with a mineral wool insulating material, a plurality of entry ports defined by a pair of center vanes, such that the pair of center vanes are disposed within the central portion for directing airflow, a turning vane disposed lateral to the central portion, the turning vane adapted for directing airflow in a lateral direction, and a straightening vane disposed on the turning vane, the straightening vane adapted for curtailing swirling of the airflow.

9. The machine of claim 8 wherein the nozzle insert is comprised of a low emissivity material.

10. The machine of claim 9 wherein the low emissivity material is aluminized steel.

11. The machine of claim 8 wherein the turning vane defines a first surface, and further wherein the straightening vane is perpendicular to the first surface.

12. The machine of claim 8 wherein the pair of center vanes define a first angle, and further wherein the first angle is between 90 and 170 degrees.

13. The machine of claim 12 wherein the first angle is 144 degrees.

* * * * *

UNITED STATES PATENT AND TRADEMARK OFFICE
CERTIFICATE OF CORRECTION

| | | |
|---|---|---|
| PATENT NO. | : 7,448,147 B2 | Page 1 of 1 |
| APPLICATION NO. | : 10/995079 | |
| DATED | : November 11, 2008 | |
| INVENTOR(S) | : Laurent Roland Parent et al. | |

It is certified that error appears in the above-identified patent and that said Letters Patent is hereby corrected as shown below:

Claim 1, line 49, delete ";" and add "airflow;"

Signed and Sealed this

Fourteenth Day of June, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,448,147 B2 | Page 1 of 1 |
| APPLICATION NO. | : 10/995079 | |
| DATED | : November 11, 2008 | |
| INVENTOR(S) | : Laurent Roland Parent et al. | |

It is certified that error appears in the above-identified patent and that said Letters Patent is hereby corrected as shown below:

Claim 1, column 4, line 49, delete ";" and add "airflow;"

This certificate supersedes the Certificate of Correction issued June 14, 2011.

Signed and Sealed this
Twelfth Day of July, 2011

David J. Kappos
*Director of the United States Patent and Trademark Office*